Patented May 8, 1951

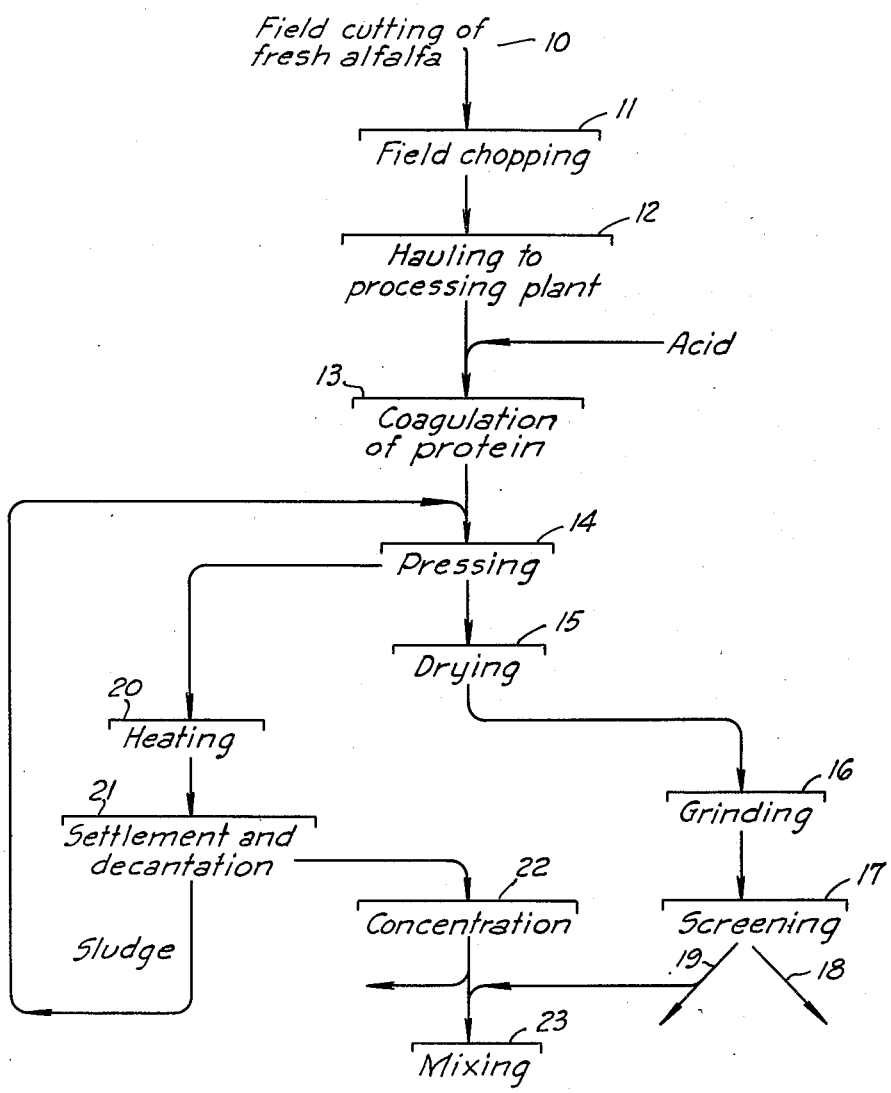

2,552,343

UNITED STATES PATENT OFFICE 2,552,343

VEGETABLE TREATMENT PROCESS

David D. Peebles, Hillsborough, Paul D. Clary, Jr., Petaluma, and Richard K. Meade, Santa Rosa, Calif., assignors to Western Condensing Company, San Francisco, Calif., a corporation of California Application March 2, 1949, Serial No. 79,242

7 Claims. (Cl. 99—8)

This invention relates generally to processes for forming marketable products from various vegetable materials, particularly the green leafy portions of succulent plants, such as alfalfa, grasses, beet tops and the like, and products resulting from such processes.

The leafy portions of succulent vegetables like alfalfa contain a substantial amount of carotin, and it is recognized that the food value of products made of such materials is dependent to a substantial degree upon the residual carotin content. It is conventional practice to cut the alfalfa in the field, and to haul it to a processing plant by truck. In a typical instance from two to six hours may elapse from the time of first mowing, until plant processing actually commences. The usual commercial plant processing involves drying of the alfalfa in contact with hot air, with or without previous chopping, after which the dried material, which may contain say 4% moisture, is frequently ground to form a dried alfalfa meal.

In processing alfalfa by conventional processes such as outlined above, the carotin content of the finished dried meal may in a typical instance be the order of 65% of the amount originally present in the green alfalfa.

It is an object of the present invention to provide a process for the treatment of green vegetable material such as alfalfa and the like, which serves to make available a maximum amount of carotin in final marketable products.

Another object of the invention is to provide a process of the above character which serves to avoid serious impairment of carotin content during air drying operations.

Additional objects and features of the present invention will appear from the following description in which the preferred embodiment has been set forth in detail in conjunction with the flow sheet of the accompanying drawing.

In general the present invention involves field treatment of the fresh green vegetable material by contacting it with a dilute ammonia solution as disclosed and claimed in our copending application Serial No. 73,934 filed Feb. 1, 1949.

Such field treatment serves to minimize deterioration of carotin content prior to plant processing. Following receipt of the material from the field, the process employs special plant processing in which juices expressed from the material are processed separately from the remaining press cake.

A desirable manner of practicing the present invention is illustrated in the accompanying flow sheet. The first operation 10 represents field cutting of fresh green alfalfa by conventional mowing equipment. In operation 11 the freshly cut material is subjected to chopping in the field, and the chopped material is then conveyed to a suitable motor truck for hauling to the processing plant, as indicated by step 12. While the material is being transferred from the chopper to the truck, it is wet with a dilute ammonia solution substantially as disclosed and claimed in said copending application Serial No. 73,934. Good results can be secured by using a 2% solution of ammonia in water, and in a typical instance 200 lbs. of such solution can be used for each ton of green alfalfa.

At the processing plant the alfalfa is first subjected to operation 13 for the purpose of coagulating vegetable protein present. A suitable coagulating operation can be carried out by heating the alfalfa to a temperature of at least about 170° F., and preferably within the range from 170 to 212° F., for a period of time such as from 3 to 6 minutes. In conjunction with this heat tretament the material is intermixed with a suitable acid, such as a dilute solution of sulphuric acid, to produce an effective hydrogen ion concentration of the order of pH 5.5 to 6.5. In general the use of higher acidity permits the use of lower treatment temperatures.

The heating operation together with the addition of the acid can be conveniently carried out by the use of suitable conveying means of the screw feed type, provided with means for injecting steam into the material, and into which the requisite amount of acid can be introduced. In addition to or in place of directly introducing live steam into the material being heated, we can utilize a feed screw of the heat exchange type having provision for circulating steam through the shaft and flights of the same, together with a steam jacketed housing for the screw.

Following coagulation at 13 the hot alfalfa is subjected to the pressing operation 14 where a substantial amount of the juice is removed. This operation can be conveniently carried out by the use of an expeller or press of the continuous feed screw type.

In a typical instance the amount of juice removed in the pressing operation may leave a press cake containing about 65% moisture, where the original fresh alfalfa being treated contains 79% moisture, and the juice may contain from 5 to 6% solids (dissolved and undissolved).

The press cake resulting from the pressing operation 14 is then subjected to the drying operation 15. Drying can be carried out by the use of conventional dehydrators, using drying air temperatures of the order of 700° F. to provide a final grinding moisture content of the order of 4 to 6%. Following the drying operation 15 the material is subjected to grinding at 16, followed by screening at 17 to produce the fractions 18 and 19 of different screen sizes. Fraction 18 may for example of such size that it passes a 35 mesh screen, while fraction 19 can be oversize material which will not pass a 35 mesh screen. The finer material will contain most of the leaf portion of the alfalfa, and the coarse or oversize material will contain more stem fiber.

The juice from the pressing operation 14 is preferably processed separately from the press cake. Thus this juice is heated at 20 to coagulate any uncoagulated protein present, and it is then subjected to settlement and decantation at 21.

The sludge solids removed from operation 21 are preferably returned to the material entering the pressing operation 14. Thus the solids of this sludge are returned to the process, and ultimately merge with the press cake. The serum decanted off at 21 is shown being concentrated at 22, to provide a concentrate containing say 50 to 75% solids, which can be utilized as will be presently described. The sludge solids contain substantially all of the carotin content of the juice, presumably because of the close association of carotin with coagulated protein.

The minus 35 mesh material removed from the screening operation at 18, is a high grade dried alfalfa which in a typical instance will have a carotin content of the order of 40 to 50 milligrams per 100 grams (dry solids). The plus 35 mesh material removed at 19 is of relatively lower carotin content, and in a typical instance will have a carotin content of about 24 to 28 milligrams per 100 grams (dry solids).

A part of the concentrated serum can be utilized to mix with the dried material as indicated. Thus a part of the plus 35 mesh material from 19 can be intermixed with concentrate from 22, to provide a modified coarse alfalfa meal.

An example of our process, assuming that it is carried out in the treatment of alfalfa, is as follows: The fresh green alfalfa had a carotin content of 30 milligrams per 100 grams (dry solids), and immediately after field mowing and chopping was wet with a 2% solution of ammonia, to the extent of using 200 lbs. of solution per 2000 lbs. of green alfalfa. A period of about 1½ hours elapsed between initial mowing and commencement of the processing operations. At the commencement of plant processing, the material had a carotin content of 30 milligrams per 100 grams (dry solids). A 5% dilute sulphuric acid solution was intermixed with the alfalfa at the beginning of plant processing, and the amount of solution thus employed was sufficient to provide an effective hydrogen ion concentration of pH 5.5. For operation 13 the material was heated to a temperature of about 212° F., for a period of about 4 minutes. In the pressing operation 14, 930 lbs. of juice was expressed for each 2000 lbs. of green alfalfa. The press cake discharged from the pressing operation 14 contained about 35% solids. The press cake was dried by the use of conventional drying equipment, in which the material was contacted with drying air at a temperature of about 700° F., to reduce the moisture content to about 4%. The dried material was then ground and screened in the manner previously described, to provide two fractions, one minus 35 mesh, and the other plus 35 mesh.

The juice removed from the pressing operation 14 was acidulated by the addition of 5% sulphuric acid solution to provide a hydrogen ion concentration of about pH 5.5. This juice was then heated to a temperature of about 212° F., after which it was subjected to settlement and decantation at 21, in a suitable tank. The coagulated protein precipitate contained in this juice settled as a sludge which as withdrawn contained about 15% solids, and about 5% of the total solids of the alfalfa and which was continuously returned to the material passing to the pressing operation 14. The sludge had a carotin content of about 30 milligrams per 100 grams (dry solids).

The serum withdrawn by decantation from 21 was concentrated at 22 to produce a concentrate containing about 50% solids.

With respect to the over-all yield obtained in the foregoing example, about 72% of the original carotin content was contained in the dried alfalfa meal recovered at 18, and this meal contained about 50% of the total solids. About 24% of the original carotin content was contained in the dried alfalfa recovered at 19. Thus taking into account the carotin found in the fractions removed at 18 and 19, the dry alfalfa meals produced by the process yielded 96% of the original carotin content contained in the original fresh green field alfalfa.

It will be evident that our process contains many novel features. Thus coagulation of protein by heat treatment prior to the pressing operation greatly facilitates expressing the juice, and in addition it causes the majority of the carotin content to remain with the fibrous and leafy material, instead of being removed with the juice. Separate processing of the expressed juice serves to recover the carotin content of the same, and this carotin content together with coagulated protein matter is returned to the process, and ultimately is recovered in the final dried alfalfa.

It will be evident that our process is subject to many modifications. For example, it is possible to carry out the pressing operation 14 in stages, rather than by use of a single piece of equipment. The screening may vary depending upon the particular type of meal desired. For example more than two screened fractions can be recovered if desired, in place of the two previously mentioned.

We claim:

1. In a process for the treatment of fresh green vegetable material having a substantial carotin content, the steps of coagulating protein contained in the material expressing juice from the material whereby part of the carotin is removed with the expressed juice and a part of the carotin remains with the press cake, processing the press cake to produce a dry material, coagulating the protein of the juice to form a protein precipitate containing the carotin of the juice, concentrating the precipitate in a sludge, and then returning the sludge to the process to merge with the press cake material.

2. In a process for the treatment of fresh green vegetable material having a substantial carotin content, the steps of coagulating the protein content of the alfalfa by heat treatment of the same, expressing juice from the material whereby a part of the carotin content is removed with expressed juice and the remainder is contained in the press cake, drying the press cake, removing coagulable protein from the expressed juice, and returning the coagulable protein to the process to merge with the press cake material.

3. In a process for the treatment of fresh green vegetable material having a substantial carotin content, the steps of acidulating the material to provide an effective hydrogen ion concentration of the order of 5.5 to 6.5 and heating the acidulated material to a temperature of the order of from 170 to 212° F., to coagulate the protein thereof, expressing juice from the material whereby a part of the carotin is removed with the juice and the remainder of the carotin remains in the resulting press cake, drying the press cake, coagulating protein of the juice by heating the juice to an elevated temperature of the order of 170 to 212° F., removing coagulable protein from the expressed juice, and returning such protein to the process to merge with the dried press cake material.

4. In a process for the treatment of fresh green vegetable material having a substantial carotin content, the steps of acidulating the material to provide an effective hydrogen ion concentration of the order of pH 5.5 to 6.5, heating the material to an elevated temperature of the order of from 170 to 212° F. to coagulate protein present, expressing juice from the material to provide a press cake, heating the juice to an elevated temperature of the order of from 170 to 212° F., removing coagulated protein from the juice as a sludge, returning the sludge to the process and mixing the same with the material passing to the pressing operation, and drying the press cake to form a marketable dried product.

5. In a process for the treatment of fresh green vegetable material having a substantial carotin content, the steps of acidulating the material to provide an effective hydrogen ion concentration of the order of pH 5.5 to 6.5, heating the material to an elevated temperature of the order of 170 to 212° F. to coagulate protein present, expressing juice from the material to provide a press cake, heating the juice to an elevated temperature of the order of 170 to 212° F., removing coagulated protein as a sludge from the remaining liquid material, concentrating and drying said liquid material to form a dry substance, drying the press cake, and mixing the dried press cake with said dry substance to form a final product.

6. In a process for the treatment of fresh green vegetable material having a substantial carotin content, the steps of acidulating the material to provide an effective hydrogen ion concentration of the order of pH 5.5 to 6.5, heating the material to an elevated temperature of the order of 170 to 212° F. to coagulate protein present, expressing juice from the material to provide a press cake, heating the juice to an elevated temperature of the order of 170 to 212° F., removing coagulated protein as a sludge from the remaining liquid material, concentrating and drying said liquid material to form a dry substance, returning the sludge to the process to merge with the press cake, drying the press cake, and mixing the dried press cake with said dry substance to form a final product.

7. In a process for the treatment of fresh green vegetable material having a substantial carotin content, the steps of heating the material to an elevated temperature of the order of from 170 to 212° F., expressing juice from the material whereby part of the carotin is removed with the expressed juice and a part of the carotin remains with the press cake, processing the press cake to produce a dry material, coagulating the protein of the juice to form a protein precipitate containing the carotin of the juice, concentrating the precipitate in a sludge, and then returning the sludge to merge with the press cake material.

DAVID D. PEEBLES.
PAUL D. CLARY, Jr.
RICHARD K. MEADE.

REFERENCES CITED

The following references are of record in the file of this patent:

UNITED STATES PATENTS

| Number | Name | Date |
| --- | --- | --- |
| 1,935,754 | Virtanen | Nov. 21, 1933 |
| 2,198,214 | Musher | Apr. 23, 1940 |
| 2,213,127 | Kirschbaum et al. | Aug. 27, 1940 |